US008834320B2

(12) United States Patent
Nefcy et al.

(10) Patent No.: US 8,834,320 B2
(45) Date of Patent: Sep. 16, 2014

(54) HYBRID VEHICLE AND CONTROL FOR A CLUTCH ENGAGING EVENT

(75) Inventors: Bernard D. Nefcy, Novi, MI (US); Daniel Scott Colvin, Farmington Hills, MI (US); Marvin Paul Kraska, Dearborn, MI (US); Walter Joseph Ortmann, Saline, MI (US); Brian Thomas Soo, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

(21) Appl. No.: 13/347,857

(22) Filed: Jan. 11, 2012

(65) Prior Publication Data

US 2013/0178330 A1 Jul. 11, 2013

(51) Int. Cl.
*B60W 10/02* (2006.01)

(52) U.S. Cl.
USPC .......................................................... 477/176

(58) Field of Classification Search
USPC ................................................ 477/5; 701/61
See application file for complete search history.

(56) References Cited

U.S. PATENT DOCUMENTS

| | | | |
|---|---|---|---|
| 4,724,939 A * | 2/1988 | Lockhart et al. ................ 192/3.3 |
| 6,342,027 B1 * | 1/2002 | Suzuki ................................. 477/5 |
| 6,524,219 B2 * | 2/2003 | Mesiti et al. ........................ 477/5 |
| 6,565,483 B2 * | 5/2003 | Segawa et al. ................. 477/174 |
| 6,808,470 B2 * | 10/2004 | Boll ................................... 477/6 |
| 6,988,572 B2 * | 1/2006 | Tatara et al. ............... 180/65.26 |
| 6,991,585 B2 | 1/2006 | Colvin et al. |
| 7,037,239 B2 * | 5/2006 | Werner et al. ................ 477/176 |
| 7,216,025 B2 * | 5/2007 | Keyse et al. ..................... 701/61 |
| 7,314,424 B2 | 1/2008 | Supina et al. |
| 7,347,803 B2 * | 3/2008 | Kobayashi et al. ............... 477/5 |
| 7,351,182 B2 * | 4/2008 | Kobayashi ......................... 477/5 |
| 7,360,616 B2 * | 4/2008 | Schiele .................... 180/65.265 |
| 7,370,715 B2 * | 5/2008 | Colvin et al. .............. 180/65.28 |
| 7,610,892 B2 | 11/2009 | Butcher et al. |
| 7,670,257 B2 * | 3/2010 | Popp et al. ......................... 477/6 |
| 7,702,444 B2 * | 4/2010 | Schiele ............................ 701/53 |
| 7,749,132 B2 * | 7/2010 | Motosugi et al. ................. 477/5 |
| 7,762,922 B2 * | 7/2010 | Dreibholz et al. ................ 477/5 |
| 7,769,518 B2 * | 8/2010 | Segawa et al. ................. 701/68 |
| 7,770,678 B2 * | 8/2010 | Nozaki et al. ............... 180/65.6 |
| 7,771,310 B2 * | 8/2010 | Tanishima ......................... 477/5 |
| 7,784,575 B2 * | 8/2010 | Yamanaka et al. ....... 180/65.275 |
| 7,878,281 B2 * | 2/2011 | Tanishima .............. 180/65.265 |
| 7,954,581 B2 * | 6/2011 | Tanishima .............. 180/65.275 |
| 7,975,791 B2 * | 7/2011 | Nozaki et al. ............... 180/65.6 |
| 7,998,026 B2 | 8/2011 | Fodor et al. |
| 8,192,324 B2 * | 6/2012 | Kraska et al. ..................... 477/5 |

(Continued)

*Primary Examiner* — Dirk Wright
(74) *Attorney, Agent, or Firm* — Brooks Kushman P.C.; David B. Kelley

(57) ABSTRACT

A method for controlling a downstream clutch in a vehicle during an upstream torque disturbance includes slipping a downstream clutch by reducing the downstream clutch pressure, varying the downstream clutch pressure to a target threshold to control the slip of the downstream clutch, increasing the downstream clutch pressure to engage the downstream clutch. A vehicle includes a first prime mover, a second prime mover connected to the first prime mover using an upstream clutch, a transmission connected to the second prime mover using a downstream clutch, and a controller connected to the first and second prime movers and the upstream and downstream clutches. The controller is configured to (i) slip the downstream clutch by reducing the pressure, (ii) vary the downstream clutch pressure to a target threshold to control the slip, and (iii) increase the downstream clutch pressure to engage the clutch.

18 Claims, 3 Drawing Sheets

(56) References Cited

U.S. PATENT DOCUMENTS

| | | | |
|---|---|---|---|
| 8,282,526 B2 * | 10/2012 | Heap et al. | 477/5 |
| 8,282,527 B2 * | 10/2012 | Suzuki et al. | 477/5 |
| 8,465,393 B2 * | 6/2013 | Lemp et al. | 477/8 |
| 8,475,330 B2 * | 7/2013 | Kaltenbach et al. | 477/5 |
| 8,565,990 B2 * | 10/2013 | Ortmann et al. | 701/67 |
| 8,651,998 B2 * | 2/2014 | Schenk et al. | 477/5 |
| 2007/0276557 A1 * | 11/2007 | Motosugi et al. | 701/22 |
| 2007/0294017 A1 * | 12/2007 | Joshi et al. | 701/67 |
| 2011/0118078 A1 | 5/2011 | Kraska et al. | |
| 2011/0118915 A1 | 5/2011 | Ortmann et al. | |
| 2012/0202646 A1 * | 8/2012 | Suzuki et al. | 477/5 |
| 2012/0238404 A1 * | 9/2012 | Schiele et al. | 477/5 |
| 2013/0296128 A1 * | 11/2013 | Nefcy et al. | 477/5 |

* cited by examiner

HYBRID VEHICLE AND CONTROL FOR A CLUTCH ENGAGING EVENT

TECHNICAL FIELD

Various embodiments relate to a hybrid vehicle and controlling a clutch engaging event in a hybrid vehicle.

BACKGROUND

Hybrid electric vehicles (HEV's) utilize a combination of an internal combustion engine with an electric motor to provide the power needed to propel the vehicle. This arrangement provides improved fuel economy over a vehicle that has only an internal combustion engine. Clutches may be used to control the power flow and during transient vehicle operations, such as pulling up the engine or the electric motor, to provide smooth operation for the driver.

For example, the engine may be shutdown in an HEV during times that the engine operates inefficiently, or is not otherwise needed to propel the vehicle. In these situations, the electric motor is used to provide all of the power needed to propel the vehicle. When the driver power demand increases such that the electric motor can no longer provide enough power to meet the demand, or if the battery state of charge (SOC) drops below a certain level, the engine needs to start quickly and smoothly in a manner that is nearly transparent to the driver to provide additional power for the vehicle. When the vehicle is being propelled by the motor, and an engine start is requested, it is desirable to control the powertrain, i.e. the engine, motor, transmission, etc., such that the flow of torque to the vehicle wheels is not substantially disrupted. A clutch may be slipped during engine start to isolate torque disturbances from the driveline. However, the present disclosure recognizes that inertia energy added to the rotating components of the system while the clutch is slipping must be dissipated quickly after the starting event without introducing discernible torque disturbances. Therefore, a need exists for a vehicle, and a method for controlling clutch engaging events in a vehicle, that reduces or eliminates driveline torque disturbances.

SUMMARY

In one embodiment, a method for controlling a downstream clutch in a vehicle during an upstream torque disturbance is provided. A downstream clutch is slipped by reducing the downstream clutch pressure. The downstream clutch pressure is tracked to a target threshold to control the slip of the downstream clutch. The downstream clutch pressure is increased to engage the downstream clutch. In another embodiment, a method for controlling a downstream clutch in a hybrid vehicle is provided. The downstream clutch connects an electric machine to a transmission. A pressure to the downstream clutch is reduced at a first rate. The downstream clutch pressure is reduced at a second rate to initiate slip of the downstream clutch. The second rate is lower than the first rate. The clutch pressure is increased to an offset above a target threshold to control the slip of the downstream clutch. The target threshold includes a driver demanded and supplied torque component and a rotational inertia component. The rotational inertia component is caused by the downstream clutch slipping. The downstream clutch pressure is reduced to the target threshold to reduce a rate of decreasing slip to land the clutch. The downstream clutch pressure is increased at a third rate to lock the clutch. The downstream clutch pressure is increased to a fourth rate to a locked clutch pressure. The fourth rate is higher than the third rate.

In yet another embodiment, a vehicle is provided with a first prime mover, a second prime mover connected to the first prime mover using a first clutch, a transmission connected to the second prime mover using a second clutch, and a controller connected to the first and second prime movers and the first and second clutches. The controller is configured to (i) slip the second clutch by reducing the pressure of the second clutch, (ii) track the second clutch pressure to a target threshold to control the slip of the second clutch, and (iii) increase the second clutch pressure to engage the clutch.

Various embodiments according to the present disclosure have associated advantages. For example, embodiments according to the present disclosure reduce or eliminate driveline torque disturbances without relying on closed loop feedback from a slip controller that controls slip or rate of slip, which may require measurement of slip or rate of change of slip. Similarly, embodiments according to the present disclosure do not rely on a slip controller with complex gains to compensate for non-linear aspects of a slipping clutch. Rather, embodiments of the present disclosure control clutch pressure and associated operating torque capacity in response to a calibrated threshold profile to provide clutch slip and associated isolation of torque disturbances while quickly dissipating rotational inertia of upstream components accumulated during clutch slipping to provide a soft landing.

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
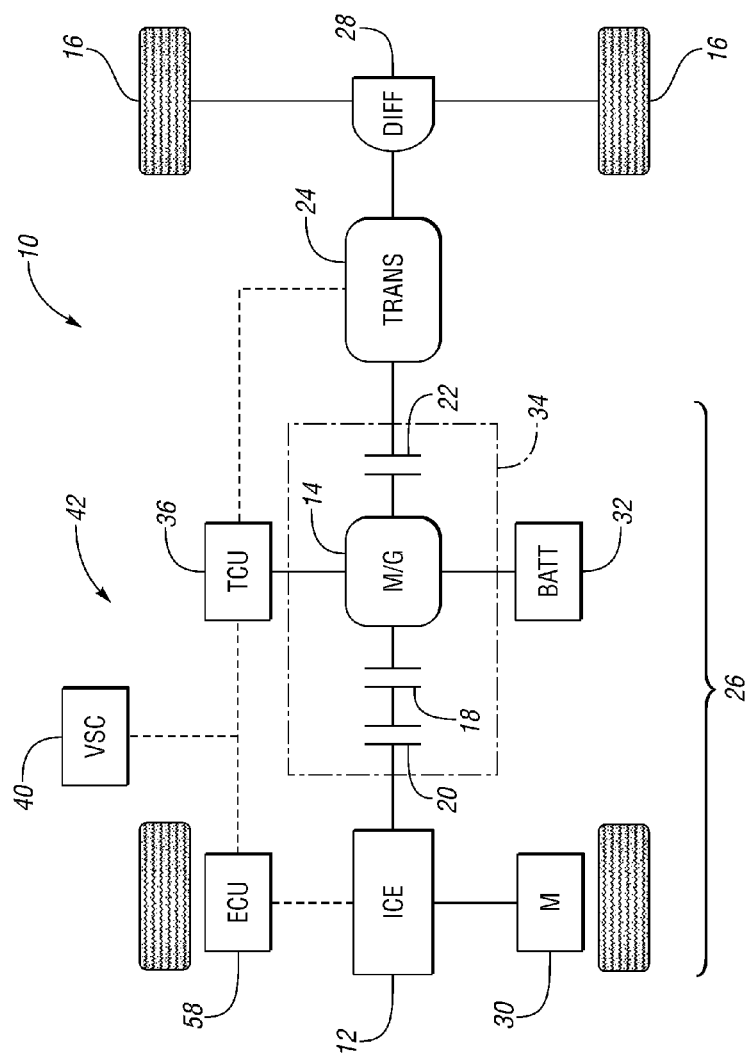
FIG. 1 is a schematic view of a hybrid vehicle having clutch control according to an embodiment.

FIG. 1 illustrates a schematic diagram of a hybrid vehicle 10 according to an embodiment. The vehicle 10 includes an internal combustion engine (ICE) 12, and an electric machine, which, in the embodiment shown in FIG. 1, is a motor generator (M/G) 14, which functions as a traction motor. The M/G 14 is configured to transfer torque to the engine 12 or to the vehicle wheels 16.

The M/G 14 is connected to the engine 12 using a first clutch 18, also known as a disconnect clutch or upstream clutch. The clutch 18 may include a damper mechanism 20 such as a series of plates and springs configured to help dampen changes in torque transferred between the engine 12 and the M/G 14 when the disconnect clutch 18 is being engaged. A second clutch 22, also known as a launch clutch or downstream clutch, connects the M/G 14 to a transmission 24, and all of the input torque to the transmission 24 flows through the launch clutch 22. The launch clutch 22 can be controlled to isolate the driveline 26, which includes the M/G 14 and the engine 12, from the transmission 24, differential 28, and the vehicle drive wheels 16. Although the clutches 18, 22 are described and illustrated as hydraulic clutches, other types of clutches, such as electromechanical clutches may also be used. In one embodiment, the clutch 22 is implemented by a torque converter and bypass clutch.

In one representative embodiment, the engine 12 is a direct injection engine. Alternatively, the engine 12 may be implemented by another type of internal combustion engine or another type of prime mover, such as a port injection engine, or a fuel cell and electric machine, for example. The engine 12 may use various fuel sources, such as diesel, biofuel, natural gas, hydrogen, or the like.

In some embodiments, the vehicle 10 also includes a starter motor 30 operatively connected to the engine 12, for example, through a belt or gear drive. The starter motor 30 may be used to provide torque to start the engine 12 without the addition of torque from the M/G 14. This allows the upstream clutch 18 to isolate the M/G 14 during starting of engine 12 and may eliminate or reduce torque disturbances that would otherwise occur if torque is transferred from the M/G 14 to the engine 12 to assist the engine start.

The M/G 14 is in communication with a battery 32. The battery 32 may be a high voltage battery. The M/G 14 may be configured to charge the battery 32 in a regeneration mode, for example when a driver demands negative wheel torque, through regenerative braking, or the like. In one example the battery 32 is configured to connect to an external electric power grid, such as for a plug-in hybrid electric vehicle (PHEV) with the capability to recharge the battery from the electric power grid, which supplies energy to an electrical outlet at a charging station.

In some embodiments, the transmission 24 is an automatic step-ratio or continuously variable transmission and connected to the drive wheels 16 in a conventional manner, which may include a differential 28. The transmission 24 may include a hydrodynamic torque converter with a bypass clutch functioning as downstream clutch 22 as previously described and may be electrically and/or electro-hydraulically controlled. Alternatively, the transmission 24 may be implemented by an automated mechanical transmission (AMT). As those of ordinary skill in the art will recognize, the systems and methods for controlling clutch engagement according to the present disclosure are generally independent of the particular type of transmission and may be used with various types of transmissions. The vehicle 10 is also provided with a pair of non-driven wheels, however, in alternative embodiments, a transfer case and a second differential can be utilized to positively drive all of the vehicle wheels.

The M/G 14 and the clutches 18, 22 may be located within a motor generator case 34, which may be incorporated into the case or housing of transmission 24. Alternatively, a separate case or housing may be provided within the vehicle 10. For embodiments having a step-ratio transmission 24, a gear box provides various gearing ratios for the vehicle 10. The transmission 24 gearbox may include clutches and planetary gearsets, or other arrangements of clutches and gear trains as known in the art.

In one embodiment, the transmission 24 is controlled using a transmission control unit (TCU) 36 to operate on a shift schedule, such as a production shift schedule, that connects and disconnects elements within the gear box to control the ratio between the transmission output and transmission input.

The TCU 36 may also act to control the M/G 14, the clutches 18, 22, and any other components within the motor generator case 34.

The crankshaft or output shaft of engine 12 is connected to the disconnect clutch 18, which in turn is connected to the input shaft for the M/G 14. The M/G 14 output shaft is connected to the launch clutch 22, which in turn is connected to the transmission 24. The components of driveline 26 of the vehicle 10 are positioned sequentially in series with one another.

An engine control unit (ECU) 38 is configured to control the operation of the engine 12. A vehicle system controller (VSC) 40 transfers data between the TCU 36 and ECU 38 and is also in communication with various vehicle sensors. The control system 42 for the vehicle 10 may include any number of controllers, and may be integrated into a single controller, or have various modules. Some or all of the controllers may be connected by a controller area network (CAN) or other system. The control system 42 may be configured to control operation of the various components of the transmission 24, the motor generator assembly 34, the starter motor 30 and the engine 12 under any of a number of different conditions, including in a way that reduces, minimizes, or eliminates torque disturbances discernible by the driver.

Under normal powertrain conditions (no subsystems/components faulted), the VSC 40 interprets the driver's demands (e.g. PRND and acceleration or deceleration demand), and then determines the wheel torque command based on the driver demand, powertrain, and battery limits. In addition, the VSC 40 determines when and how much torque each power source needs to provide to meet the driver's torque demand, maintain state of charge of the battery 32, and to achieve a desired operating point (torque and speed) of the engine 12.

Although the operation of the clutches 18, 22 described herein uses the term "pressure", thereby implying a hydraulic clutch, other types of devices, such as electromechanical clutches or torque converters with bypass clutches, may also be used. In the case of hydraulic clutches, the pressure on the clutch plates is related to torque capacity. In the same way, the forces acting on the plates in a non-hydraulic clutch are also related to torque capacity. Therefore, for consistency in nomenclature, unless otherwise specifically defined, the operation of the clutches 18, 22 described herein are in terms of "pressure", though it is understood that it also includes situations where a non-hydraulic force is applied to the clutch plates in a non-hydraulic clutch.

To prepare the clutch for use, the clutch is filled and then stroked. The clutch is stroked by increasing the pressure to the stroke pressure to prepare the clutch for engagement by taking play out of the clutch by reducing the clearance between the clutch plates. The clutch may be controlled after stroke by increasing the pressure, thereby controlling the torque capacity, slip, and/or torque transferred by the clutch, and the clutch is then in an active control phase. The clutch may be locked by increasing the pressure to the clutch until there is no slip in the clutch and may include increasing the pressure to a maximum design pressure. Engaging the clutch may refer to controlling and/or locking the clutch.

When one of the clutches 18, 22 is locked, the rotational speeds of the driveline components on either side of the clutch are the same. Slip is the speed difference from one side of a clutch to the other, such that when one of the clutches is slipping, one side has a different speed than the other. For example, if the M/G 14 output rotational speed is 1500 rpm and the launch clutch 22 is slipping at 100 rpm, the transmission 24 side of the launch clutch is rotating at 1600 rpm. Alternatively, if the M/G 14 output rotational speed is 1600 rpm and the launch clutch 22 is slipping at 100 rpm, the transmission 24 side of the launch clutch 22 is rotating at 1500 rpm.

For example, when the clutch is at stroke pressure, the capacity of the clutch is near zero and the clutch piston or the clutch plates are at just at the point of contact. At the stroke pressure, the clutch is slipping and transmitting near zero torque, and it is ready to be quickly controlled or locked. The stroke pressure is a fixed value of pressure for the clutch.

As used in this disclosure, the torque capacity of a clutch, such as clutch 18, 22, refers to an operating torque capacity corresponding to the maximum amount of torque that can be transmitted through the clutch for a particular clutch pressure. In general, increasing the clutch pressure will increase the clutch capacity and allow more torque to be transmitted through the clutch. Clutch capacity can be determined for a particular (constant) clutch pressure by increasing torque on one side of the clutch up to the point where the clutch starts to slip. After slipping starts, the torque capacity of the clutch stays generally constant if the pressure stays constant, as the dependence on slip speed is typically small. As such, at a given torque capacity, if the torque increases on the input side of the clutch, the speed will increase on that side of the clutch (and the slip will increase) while the torque transmitted through the clutch remains substantially constant because the clutch is at a given torque capacity. Alternatively, if the clutch is slipping and at a constant pressure, lowering the torque on the input side of the clutch (thus slowing the rotational speed on that side) will slow or stop the slip. Similarly, for a given torque through the clutch, the clutch will begin to slip or increase slip if clutch pressure is sufficiently lowered. A clutch is locked when there is no slip in the clutch. When a clutch is locked at full pressure it is typically designed such that it does not slip with an increase in torque up to the design limit or failure. The torque capacity of a locked clutch at full pressure is the maximum designed torque capacity.

While the clutch is slipping the input and output sides of the clutch are effectively isolated. As such, the speed (and torque of torque producers) on one side of the clutch may vary and be disturbed while the torque transferred to the other side of the clutch is limited or isolated based on the current torque capacity of the clutch (i.e. the torque through driveline 26 may vary but the transmission 24 and wheels 16 will receive a constant torque through the clutch 22). In this way, the driveline 26, including the engine 12 and the M/G 14, is ostensibly isolated from the transmission 24 and drive wheels 16, and the vehicle occupants will not be subject to torque disturbances resulting from torque being transferred between the M/G 14 and the engine 12 when connecting the engine 12 to the M/G 14 using the disconnect clutch 18, such as during starting of engine 12.

In some embodiments, the starter motor 30 is used to rotate the engine 12 to facilitate starting of the engine 12. After the engine 12 is fueled and engine start is detected, the pressure level of the disconnect clutch 18 can be raised to engage or lock the disconnect clutch 18 and connect the M/G 14 to the engine 12. To isolate the vehicle wheels 16 from disturbances that may occur during the transfer of torque between the M/G 14 and the engine 12 when the disconnect clutch 18 is being controlled or locked, the launch clutch 22 may be slipped. Controlling the pressure and associated slip of the launch clutch 22 and soft landing the clutch 22 may reduce disturbances perceptible to the driver.

Figure 2:
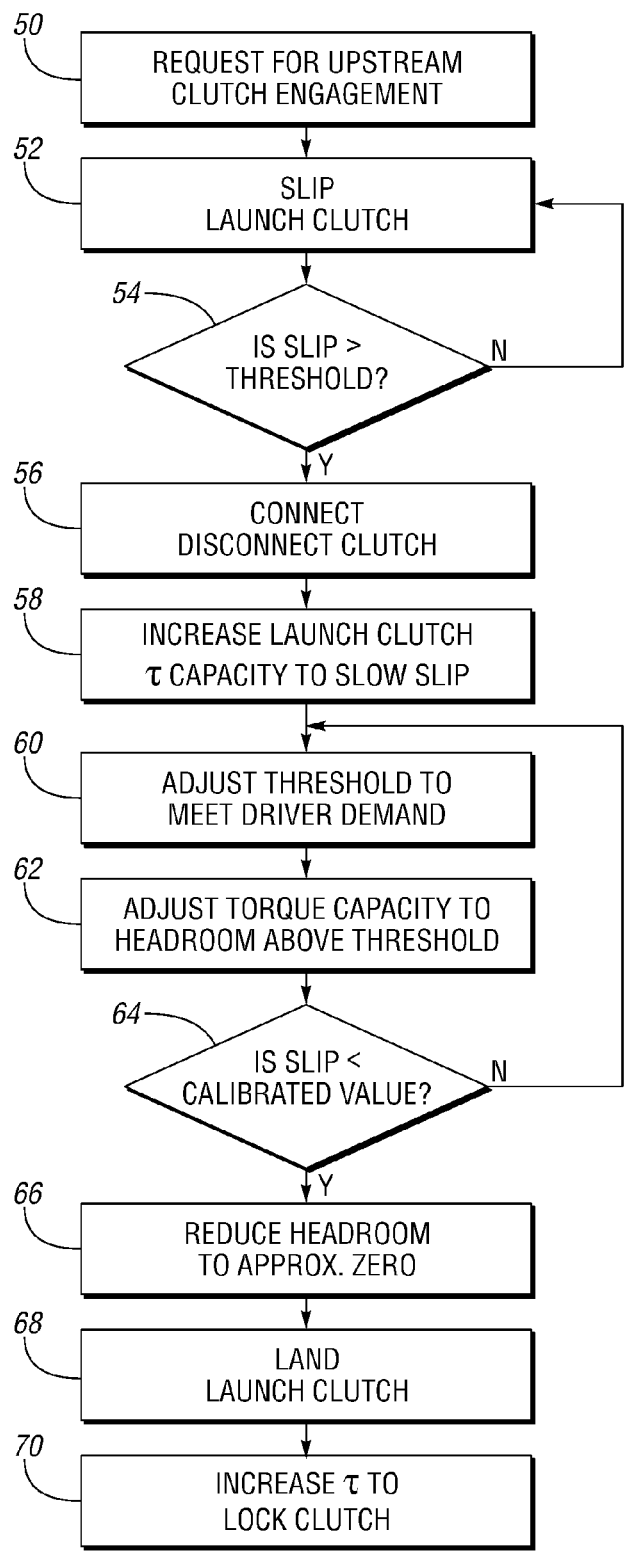
FIG. 2 is an overview process diagram illustrating operation of a system or method for controlling a clutch engaging event in a vehicle as generally represented in FIG. 1.

FIG. 2 illustrates a flow diagram for controlling the launch clutch 22 such that disturbances to the driver may be reduced or minimized. The process begins when the VSC 40 processes a request for clutch engagement for the upstream clutch 18 at 50. This could be due to a request for the vehicle 10 to pull up (start) the engine 12, for example. The TCU 36 then sends a command to the launch clutch 22 to begin slipping at 52.

The controller 42 slips the launch clutch 22 until the level of slip is at a threshold value or predetermined value by monitoring the amount of slip at 54. The slip may be a positive or negative value based on the relative speed difference of the clutch 22 plates. Positive slip in the clutch 22 occurs for example during an engine 12 start to meet a vehicle 10 demand, where the engine 12 is pulled up by the starter motor 30 and the driveline 26 is producing positive torque to the wheels 16. Negative slip in the clutch 22 occurs, for example, during an engine 12 start when regenerating, where the engine 12 is pulled up by the starter motor 30 and the driveline 26 is receiving negative torque (or the driveline is in effect producing negative torque). The absolute value of the slip of the clutch 22 is compared to a threshold as represented at 54.

When the slip is greater than the threshold at 54, the control system 42 sends a command to the disconnect clutch 18 to connect or engage the clutch 18 at 56. The control system 42 then increases the launch clutch 22 torque capacity at 58 to decrease or control the amount of slip in the launch clutch 22.

The control system 42 determines and adjusts a torque threshold for the launch clutch 22 at 60 using a model for torque for incipient slip of the clutch 22, i.e. the minimum torque needed for zero slip, Alternatively, the control system 42 determines the torque threshold from the amount of torque that needs to be transmitted through the clutch 22 to meet driver demand, which includes the driver demand minus any inertia torque associated with rotational motion (slip) of the clutch 22 and driveline 26. The control system 42 controls the clutch pressure to adjust the torque capacity of the clutch 22 to an offset, or headroom, above the torque threshold at 62, which acts to control the slip of the clutch 22 and keep the slip at a relatively low value. The control system continues to adjust the torque threshold and the torque capacity at 60 to meet driver demand until starting the clutch 22 closing (engaging) event. This maintains a controlled amount of slip in the launch clutch 22, which isolates the driveline 26 from the wheels 16.

Once the slip of the launch clutch 22 is below a calibrated or predetermined value at 64, the control system 42 reduces the offset or headroom between the torque capacity and the torque threshold to approximately zero at 66, or to some other predetermined value. This decreases the rate of reduction in the slip of the clutch 22 and assists in a softer landing for the clutch 22, which also decreases discontinuities or torque disturbances to the wheels 16. The control system 42 then lands or engages the launch clutch 22 at 68, and increases the torque to the clutch 22 at 70 to lock the clutch 22.

Figure 3:
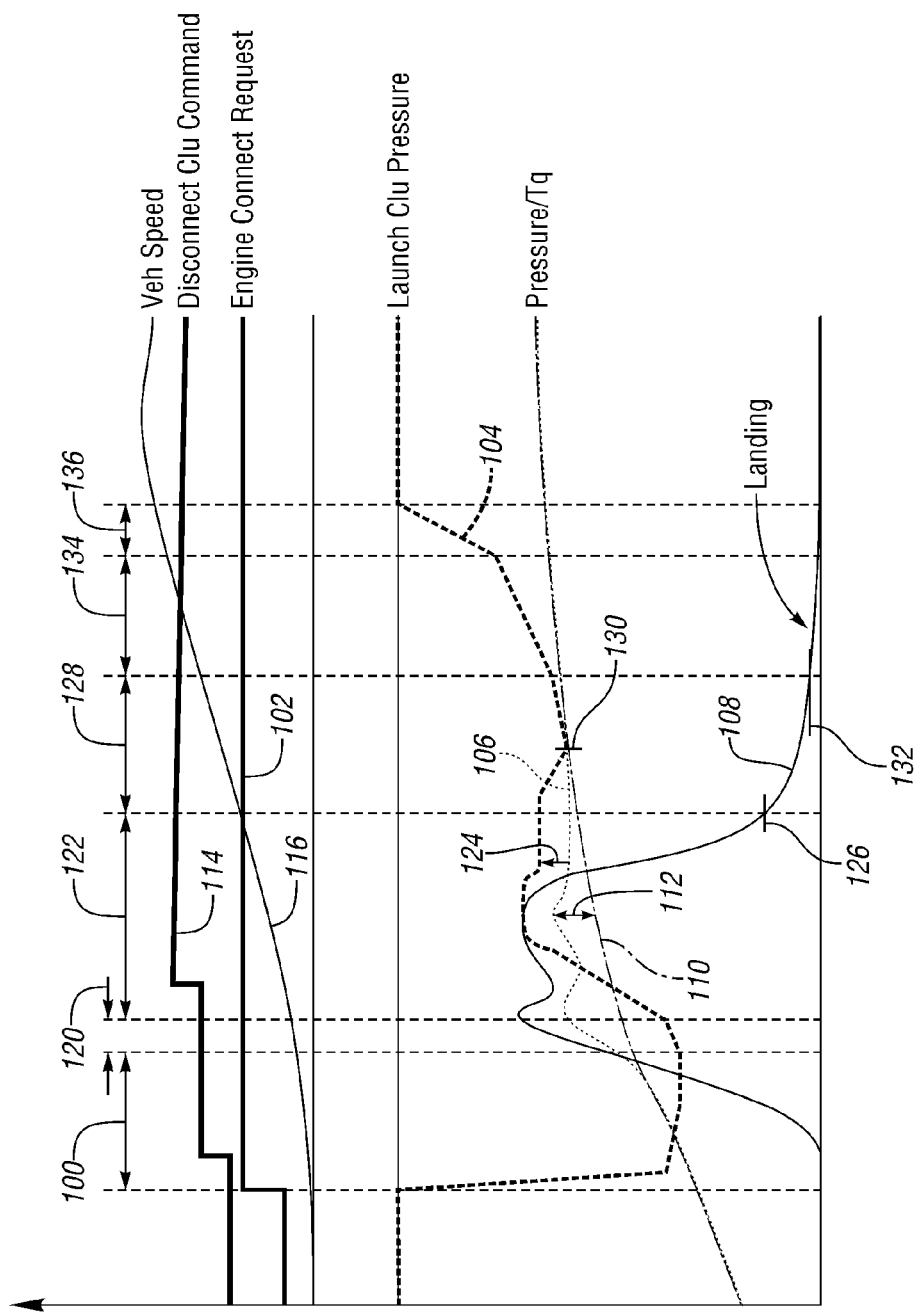
FIG. 3 is a chart of the vehicle powertrain component operation during a clutch engaging event according to an embodiment.

FIG. 3 is a chart depicting an example of the operational characteristics of various vehicle 10 powertrain components during a clutch engaging event, such as an engine 12 start with open loop inertia torque dissipation in the launch clutch 22. Of course, other implementations according to the various embodiments are also contemplated.

The first stage or state one 100 in the process is entered when requested by the VSC 40, for example by an engine 12 connect request 102, shown as a step increase in the command at the beginning of the state 100. The first state 100 may be initiated by the VSC 40 for an engine pull up or pull down request, for a transmission shift, for slipping the electric machine on vehicle launch, for a torque converter unlocking event if the clutch 22 is a bypass clutch, or other causes of torque disturbances in the vehicle. The launch clutch 22 pressure 104, or torque capacity, is rapidly reduced at a first rate at the beginning of the state 100 from a lock pressure to a calibrated pressure above the torque for incipient slip (TIS)

line 106 in preparation for slipping the clutch 22 while still engaged with zero slip. The calibrated pressure may be based on an empirical value. The rapid pressure reduction to the clutch 22 serves to remove excess torque capacity from the clutch quickly. The launch clutch pressure 104 is the pressure command to the clutch 22, or alternatively may represent the actual pressure in the clutch 22. As the clutch 22 pressure approaches the TIS line 106, the pressure reduction rate in the clutch 22 is reduced to prevent a sudden slip of the launch clutch 22. The clutch 22 pressure is slowly lowered below the TIS line 106 until the clutch begins to slip, as shown by line 108.

The TIS line 106 represents the clutch pressure that provides the minimum torque capacity that can hold the launch clutch 22 without slipping, and may be found empirically through experimentation or modeling, for example. The TIS line 106 may be determined by the VSC 40 using a lookup table or from an equation modeled from empirical data. The torque for incipient slip (TIS) represented by line 106 also represents the torque to be transmitted through the clutch 22 to meet driver demanded torque at the wheels, as produced by the engine 12 and the M/G 14 at the clutch 22. The driver demanded and produced torque is shown by line 110 and may be linked to a torque request at an accelerator pedal, for example. Any increase in the TIS line 106 above the driver demanded and produced torque 110 may be due to the inertia torque caused by the inertial energy added from the engine 12 and the M/G 14 during slipping of the clutch 22, as shown by 112, for example. The TIS line 106 therefore represents the driver demanded and produced torque plus any amount of inertia torque.

During the state one 100, once the launch clutch 22 is slipping, the process to connect the disconnect clutch 18 begins as shown by the disconnect clutch command 114 to stroke the clutch 18. This will allow engine 12 torque to contribute to propelling the vehicle 10, as shown by the increasing vehicle speed across the chart at 116. The connection of the disconnect clutch 18 may disturb the driveline and slipping the clutch 22 isolates these disturbances from the wheels 16. Once the slip of the launch clutch 22 is above a calibrated or predetermined value, the TCU 36 leaves the state one 100 and enters state two 120.

During state two 120 the launch clutch 22 pressure 104 is slowly increased to the torque for incipient slip line 106. The TIS line 106 also is increasing due to the increased inertia torque. The torque capacity needed to dissipate the inertia energy that was added to the upstream rotating components of the system due to launch clutch slip, as shown by 112, is included in the TIS line 106. The added torque capacity 112 is a continuous function of slip. The slip 108 which started in the state one 100 increases through state two 120 as well. However, a pressure increase in clutch 22 eventually slows the rate of increase of the slip of clutch 22, thus slowing the increase in inertia energy which in turn slows the increasing TIS line 106. A lag may be present between the pressure command or clutch pressure 104 and the slip 108. The maximum value of slip 108 also represents the total inertia energy that is added to the rotating components upstream of clutch 22. The TIS line 106 may also change at any time due to a change in driver demanded and produced torque. A failsafe mechanism may exist within state two 120 to abort the process if the slip exceeds a calibrated value, for example, by increasing the pressure to slow the slip.

State two 122 is entered after state one 120. During state two 122, the TIS line 106 is continually adjusted by the controller 22 by adding the torque capacity needed to dissipate the inertia energy that was added to the upstream rotating components of the system due to launch clutch slip, as shown by 112. The added torque capacity 112 is a continuous function of slip. The TIS line 106 represents the extra capacity to soft land, or lock, the launch clutch 22. The TIS line 106 may also change due to a change in driver demanded and produced torque. As shown at the beginning of state two 122, the launch clutch pressure 104 is well below the TIS line 106, and the extra capacity would prolong stopping the slip in the clutch 22 when it needs to be landed or engaged. Therefore, the TCU 36 raises the clutch 22 pressure 104 to a calibrated headroom 124, or offset, above the TIS line 106 to control or reduce the slip 108. The headroom 124 is calibrated to reduce slip 108 to prepare the launch clutch 22 for a soft landing in a reasonable time. The reasonable time may be determined based on a number of considerations, such as thermal capacity of the clutch 22 and driveability, for example. As shown during the latter portion of state two 122, the clutch pressure 104 is maintained at the headroom 124 above the TIS line 106 to reduce the slip 108 of the launch clutch 22. The clutch pressure 104 with the headroom 124 above the TIS line 106 is maintained as described until the slip 108 falls below a calibrated or predetermined value shown at point 126, at which point the TCU 36 exits state two 122.

In state three 128, the headroom 124 for the clutch pressure 104 above the TIS line 106 is reduced to zero as shown at point 130, approximately zero, or to a lower headroom value. The reduction of the clutch pressure 104 slows the rate of reducing slip, as shown by the flattening of the slip curve 108, to start the soft landing of the clutch 22. Additionally, as the slip 108 falls, the TIS line 106 is reduced, since it is a function of slip and inertia torque, towards the driver demand and produced line 110. The TIS line 106 may also change at any time due to a change in driver demanded and produced torque. State three 128 exits when the slip 108 is lower than another calibrated or predetermined value closer to zero as shown at point 132.

In state four 134, the launch clutch 22 is landed or engaged, which may be a soft landing, as shown by the slip curve 108. The clutch pressure 104 is increased slowly at a first rate to land and lock the launch clutch 22 without causing a large disturbance. A timer or other mechanism may be used to confirm that the clutch 22 is locked. Alternatively the lock may be confirmed using slip information, i.e. slip is zero for a time period. Once the lock is confirmed by the timer, the TCU 36 leaves state four 134.

In state five 136, the launch clutch pressure 104 is ramped to a maximum torque capacity at the lock pressure for the clutch 22, and the state 136 is exited when the clutch design torque capacity is reached. At this point, the engine 12 and M/G 14 are both operating and are connected to one another through a locked disconnect clutch 18. The engine 12 and M/G 14 are providing torque to the transmission 24 and wheels 16 through a locked launch clutch 22 to propel the vehicle 10, and the torque may be increased or varied without slip in the clutches 18, 22.

As such, various embodiments according to the present disclosure reduce or eliminate driveline torque disturbances without relying on a slip controller that controls slip or rate of slip using a closed loop control algorithm, which may require measurement of slip or rate of change of slip. Similarly, embodiments according to the present disclosure do not rely on a slip controller with complex gains to compensate for non-linear aspects of a slipping clutch. Rather, embodiments of the present disclosure control clutch pressure in response to a calibrated profile threshold to provide clutch slip and associated isolation of torque disturbances while quickly dissipating rotational inertia accumulated during clutch slipping to provide a soft landing. The slip in the clutch 22 may be measured as a part of a feed forward algorithm to provide information to the controller 22 regarding when to enter the next state.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments that are not explicitly illustrated or described. Where one or more embodiments have been described as providing advantages or being preferred over other embodiments and/or over prior art with respect to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. As such, any embodiments described as being less desirable relative to other embodiments with respect to one or more characteristics are not outside the scope of the claimed subject matter.

What is claimed is:

1. A method for controlling a downstream clutch in a hybrid vehicle, the downstream clutch connecting an electric machine to a transmission, the method comprising:
   decreasing downstream clutch pressure at a first rate;
   decreasing the downstream clutch pressure at a second rate to initiate slip of the downstream clutch, the second rate lower than the first rate;
   increasing the downstream clutch pressure to reduce the slip of the downstream clutch at a first slip rate;
   decreasing the downstream clutch pressure to reduce the first slip rate to land the clutch;
   increasing the downstream clutch pressure at a third rate to reduce the slip to zero; and
   increasing the downstream clutch pressure at a fourth rate to a locked clutch pressure, the fourth rate higher than the third rate.

2. The method of claim 1 wherein the downstream clutch is controlled in response to an upstream torque disturbance caused by an upstream clutch engaging event.

3. The method of claim 1 wherein increasing the downstream clutch pressure to reduce the slip comprises:
   increasing the downstream clutch pressure to an offset above a target threshold to control the slip of the downstream clutch, the target threshold including a driver demanded and supplied torque component, and a rotational inertia component associated with upstream components rotating while the downstream clutch is slipping.

4. The method of claim 3 wherein the target threshold is determined from a model of torque for incipient slip.

5. The method of claim 3 wherein the target threshold varies with slip speed.

6. The method of claim 1 further comprising increasing upstream clutch pressure to engage an upstream clutch while slipping the downstream clutch.

7. The method of claim 3 further comprising maintaining the downstream clutch pressure at the offset above the target threshold until the slip falls below a calibrated value.

8. The method of claim 7 wherein decreasing the downstream clutch pressure to land the clutch further comprises decreasing the downstream clutch pressure by removing the offset such that the downstream clutch pressure is approximately equal to the target threshold to decrease the first slip rate to land the downstream clutch.

9. The method of claim 1 wherein slipping the downstream clutch isolates a driveline of the hybrid vehicle from disturbances.

10. The method of claim 1 wherein all of an input torque to a transmission flows through the downstream clutch.

11. The method of claim 1 wherein input torque to the transmission flows through the downstream clutch.

12. A vehicle comprising:
   a first prime mover;
   a second prime mover connected to the first prime mover using an upstream clutch;
   a transmission connected to the second prime mover using a downstream clutch; and
   a controller connected to the first and second prime movers and the upstream and downstream clutches, the controller configured to (i) decrease downstream clutch pressure at a first rate, (ii) decrease the downstream clutch pressure at a second rate to initiate slip of the downstream clutch, the second rate lower than the first rate, (iii) increase the downstream clutch pressure to reduce the slip of the downstream clutch at a first slip rate, (iv) decrease the downstream clutch pressure to reduce the first slip rate to land the clutch, (v) increase the downstream clutch pressure at a third rate to reduce the slip to zero, and (vi) increase the downstream clutch pressure at a fourth rate to a locked clutch pressure, the fourth rate higher than the third rate.

13. The vehicle of claim 12 wherein the controller is configured to increase the downstream clutch pressure to reduce the slip at the first slip rate by offsetting the downstream clutch pressure above a target threshold.

14. The vehicle of claim 13 wherein the controller is configured to decrease the downstream clutch pressure to reduce the first slip rate to land the clutch by removing the offset such that the downstream clutch pressure is approximately equal to the target threshold.

15. The vehicle of claim 12 wherein the downstream clutch is a torque converter.

16. The vehicle of claim 12 wherein the first prime mover, the upstream clutch, the second prime mover, the downstream clutch, and the transmission are in line with one another.

17. The vehicle of claim 12 wherein the downstream clutch is a bypass clutch for a torque converter.

18. A method for controlling a downstream clutch connecting an electric machine to a transmission comprising:
   decreasing downstream clutch pressure (DCP) at a decreasing rate to initiate slip;
   increasing DCP at a first slip rate (FSR) to reduce slip;
   decreasing DCP to reduce the FSR to land the clutch;
   increasing DCP at a third rate to reduce slip to zero; and
   increasing DCP at a fourth rate higher than the third rate to lock the clutch.

* * * * *